United States Patent
La Ferla et al.

(10) Patent No.: US 7,250,234 B2
(45) Date of Patent: Jul. 31, 2007

(54) LITHIUM BATTERY WITH RETAINED GEL-ELECTROLYTE

(75) Inventors: Raffaele La Ferla, Redondo Beach, CA (US); Larisa V. Malinovskaya, Torrance, CA (US)

(73) Assignee: Caleb Technology Corporation, Torrance, CA (US)

( * ) Notice: Subject to any disclaimer, the term of this patent is extended or adjusted under 35 U.S.C. 154(b) by 556 days.

(21) Appl. No.: 10/344,332

(22) PCT Filed: Aug. 10, 2001

(86) PCT No.: PCT/US01/25076

§ 371 (c)(1), (2), (4) Date: Feb. 10, 2003

(87) PCT Pub. No.: WO02/15298

PCT Pub. Date: Feb. 21, 2002

(65) Prior Publication Data

US 2003/0211397 A1 Nov. 13, 2003

Related U.S. Application Data

(60) Provisional application No. 60/224,721, filed on Aug. 11, 2000.

(51) Int. Cl.
*H01M 10/40* (2006.01)
(52) U.S. Cl. ............... 429/303; 429/307; 29/623.1
(58) Field of Classification Search ........... 429/303, 429/307, 231.95, 334, 336; 29/623.1; 252/62.2
See application file for complete search history.

(56) References Cited

U.S. PATENT DOCUMENTS

| 4,156,754 A | 5/1979 | Cobbs, Jr. et al. |
| 4,699,857 A | 10/1987 | Giovannoni et al. |
| 4,849,311 A | 7/1989 | Itoh et al. |
| 5,248,573 A | 9/1993 | Arkens et al. |
| 5,362,582 A | 11/1994 | Chang et al. |
| 5,998,065 A | 12/1999 | Tsutsumi et al. |
| 6,001,509 A | 12/1999 | Kim et al. |
| 6,280,878 B1 * | 8/2001 | Maruyama et al. .......... 429/233 |
| 6,492,064 B1 * | 12/2002 | Smart et al. ................. 429/330 |

FOREIGN PATENT DOCUMENTS

EP  0967 677 A1  12/1999

OTHER PUBLICATIONS

EP Application No. 01 96 2045 EPO Supplementary Search Report dated Feb. 14, 2007.

* cited by examiner

*Primary Examiner*—Raymond Alejandro
*Assistant Examiner*—Monique Wills
(74) *Attorney, Agent, or Firm*—McDermott Will & Emery LLP (57) ABSTRACT

A microcomposite structure for use as a component of a lithium battery is formed from a liquid phase mixture by the removal of a solvent. The microcomposite structure includes a continuous reticulated solid polymer phase, a formed in situ gel-electrolyte phase, and a solid phase surfactant at the interface between the gel and polymer phases for stabilizing the gel phase within the pores of the solid polymer phase. The liquid phase mixture comprises a polymer blend, an aprotic solvent system for the polymer blend, a substantially dissolved anionic surfactant, and a phase separation liquid that is miscible with the aprotic solvent system, but in which the polymer blend is substantially insoluble. The microcomposite structure is formed by casting the liquid phase mixture on a surface and removing solvent until the microcomposite structure forms.

10 Claims, 5 Drawing Sheets

LITHIUM BATTERY WITH RETAINED GEL-ELECTROLYTE

RELATED APPLICATIONS

This application is a continuation of International Application No. PCT/US01/25076, filed Aug. 10, 2001, which claims the benefit of U.S. Provisional Patent Application No. 60/224,721, filed Aug. 11, 2000, the entire contents of which are hereby incorporated herein by reference.

BACKGROUND OF THE INVENTION

1. Field of the Invention

This invention relates to lithium batteries. More particularly, the invention relates to lithium batteries that have a liquid electrolyte, but enjoy the mechanical advantages of a solid phase electrolyte without sacrificing the electrochemical advantages of a liquid electrolyte.

2. Description of the Prior Art

The advantages and construction of lithium batteries are well known. See, for example, Tsutsumi et al. U.S. Pat. No. 5,998,065, and Kim et al. U.S. Pat. No. 6,001,509. Lithium batteries serve well as secondary batteries, and are capable of being reduced in size as compared with present battery designs that are widely used. They are also capable of being reduced in weight so that in the areas, for example, of form factor, size, weight, safety and capacity, lithium batteries substantially exceed the capabilities of the present designs. Difficulties have been encountered, however, in devising satisfactory electrolyte-separator combinations that would maximize the potential available in the lithium battery technology.

Previously, both liquid or gel organic electrolyte and solid phase electrolyte lithium batteries have been proposed. The liquid electrolyte based designs previously suffered from substantial problems of safety and utility due to the inherent nature of the liquid phase electrolyte. It leaked out of the container if the container was ruptured. This destroyed the utility of the battery and risked, for example, fire, explosion, toxic release, and damage to expensive equipment. In general, the previous liquid electrolyte based lithium battery designs were fragile. The previous liquid based designs did, however, enjoy the advantage that they could be put through many charge-discharge cycles without significant loss of function. Also, prior liquid electrolyte based lithium batteries could be charged and discharged rapidly without undue heat build up, because the resistance of the liquid electrolyte was low. By contrast, prior solid electrolyte based lithium battery designs were rugged, but suffered from excessive heat build up during rapid charging and discharging, and were only good for a limited number of charge-discharge cycles.

It had previously been proposed to modify the surface energy of a reticulated polystyrene foam separator in a lithium battery so as to promote the retention of a liquid electrolyte within the pores of the separator. Such previous proposals involved, for example, incorporating a molecule in the polymer chain of the solid phase polystyrene that would increase its surface energy. Sulfonate containing molecules had been proposed for this purpose. The inclusion of sulfonate or other surface energy modifying molecules within the skeleton of the solid phase polymer caused an undesired negative impact on the physical properties of polystyrene. Alternatively, previous proposed expedients for increasing the surface energy of the porous separators in lithium batteries often required that the electrolyte be prepared separately from the skeleton so that the walls of the skeleton could be washed with a surfactant before the liquid electrolyte was added. This contributed undesirably to the cost and complexity of the manufacturing procedure. Also, the retention of the liquid electrolyte within the foam skeleton was less than unsatisfactory.

Itho U.S. Pat. No. 4,849,311 discloses an ionic conductor, liquid or solid, that is immobilized in the pores of a porous solid polymer membrane. Immobilization of the liquid ionic conductor is said to be accomplished by the combination of using pore sizes of less than 0.1 microns, an appropriate choice of solvent, and surface treatment. The disclosed surface treatments to control the wetability of the polymer membrane are plasma and graft polymerization on the surface. The liquid contact angle to the polymer is said to be not more than 90, and preferably not more than 70 degrees. Neither the use of nor the need for a solid surfactant at the interface between the solid and liquid phases is suggested.

The inclusion of solid surfactants in foamed thermoplastic materials is known. See, for example, Cobbs et al. U.S. Pat. No. 4,156,754. According to The disclosure of Cobb et al. a finely divided surfactant is mixed with a gas containing molten thermoplastic to stabilize the gas.

Those concerned with these problems recognize the need for an improved lithium battery.

BRIEF SUMMARY OF THE INVENTION

The present invention captures the advantages of both the liquid and solid phase electrolyte lithium batteries by providing for the retention of the gel electrolyte within the battery even if the container is punctured. It enjoys the mechanical and safety advantages of the solid phase designs, and the electrochemical advantages of the liquid or gel phase designs. The present invention is particularly concerned with the retention of the gel electrolyte within the pores in a reticulated foam separator. The gel electrolyte is retained according to the present invention because it aggressively wets the walls of the pores. The gel electrolyte is encouraged to aggressively wet the walls of the foam separator, for example, by the presence of a solid phase surfactant in the separator-gel electrolyte system.

The reticulated solid phase foam is formed from a liquid phase mixture that preferably contains substantially all of the ingredients for both the foam and the electrolyte, including the compositions to form a finely divided solid phase surfactant. The ingredients are formed into a liquid phase mixture. The liquid phase mixture is then cast or otherwise formed into the desired shape, and dried or otherwise treated to form a solid phase reticulated foam skeleton and a formed in situ gel phase electrolyte entrained therein. When the solid phase skeleton forms, the gel phase electrolyte is present as a dispersed interconnected inclusion within the solid phase. The solid phase surfactant precipitates and is also present, particularly at the interface between the gel and solid phases. The solid phase surfactant generally preferentially collects at this gel-solid interface.

According to the present invention a solid phase powder which is not soluble in the electrolyte to any significant degree is formed in situ as the system forms so that solid phase particles of surfactant are distributed throughout at least the surface of the reticulated foam as it is formed. The exact mechanism is not known, and applicant does not wish to be bound by any particular theory. These finely divided solid phase surfactant powders appear to be bound physically to the surface of the solid phase skeleton. The presence of these solid particles apparently causes the gel phase electrolyte to thoroughly wet the surface of the reticulated foam. As a result, the gel-electrolyte stays in the foam, even when the foam is punctured, and the battery continues to operate. Lithium batteries with punctured container walls can even be recharged, if necessary. The solid phase surfactant must be selected so that it also retains its surfactant properties under the conditions that are encountered within the battery during its useful life.

During the formation of the microcomposite structure the solvent is removed from the liquid phase mixture until the microcomposite structure forms. The solid and the gel phases all form in situ. The gel-electrolyte forms in situ in the pores of the solid polymer, and is stabilized there by the solid phase surfactant.

Lithium batteries constructed according to the present invention find particular application in, for example, medical devices, communication devices, lap top computers, microelectronics of various types, aerospace and defense applications, solar energy applications, electric vehicle uses, battery clothing such as a battery vest, and the like. Rechargeable liquid or gel electrolyte lithium ion batteries offer significant advantages in energy density and cycle life over of the principal rechargeable battery technologies that are currently in use. Such lithium batteries offer very high gravimetric and volumetric energy densities. Such batteries can also generally be configured into substantially any geometric configuration that may be required by a particular application.

The present invention provides its benefits across a broad spectrum of batteries. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the Invention being disclosed despite what might appear to be limiting language imposed by the requirements of referring to the specific examples disclosed.

Other objects, advantages, and novel features of the present invention will become apparent from the following detailed description of the invention when considered in conjunction with the accompanying drawings.

BRIEF DESCRIPTION OF THE DRAWINGS

Referring particularly to the drawings for the purposes of illustration only and not limitation.

DETAILED DESCRIPTION OF THE PREFERRED EMBODIMENTS

EXAMPLES

A preferred separator for a lithium-ion battery was prepared by forming a solution comprising a polymer blend that included 0.45 grams of polyvinyl chloride (PVC) having approximately 242,000 molecular units, 0.15 grams of polystyrene (PS) having approximately 283,000 molecular units. The solution also included 0.30 grams of the electrolyte salt, lithium hexaphosphide (LH), and 0.3 grams of the anionic surfactant, lithium toluene sulfonate (LTS). An aprotic solvent system for dissolving the PVC, PS and LH was prepared. The aprotic solvent system included 0.15 grams of propylene carbonate, 0.10 grams of dimethyl carbonate, 0.15 grams of ethylene carbonate, and 5 grams of tetrahydrofuran. A second solvent system was prepared for dissolving the LTS. The second solvent system comprised 1 gram of ethanol and 0.5 grams of acetone. The phase separation of the PVC and PS was controlled by the addition of 1.5 grams of a cyclohexane. Cyclohexane is a liquid that is soluble in the aprotic solvent system but does not dissolve the PVC or PS. About 0.05 grams of Crown ether 12 (Merck &Co.) were added to improve the efficiency of any battery that is made using the resulting separator.

All of the ingredients were mixed together, and the solution was well stirred in an environment with a dry argon atmosphere. The argon contained less than 1 part per million of water vapor. The solution was then cast on a flat horizontal glass plate to form a sheet of liquid having a thickness of about 400 microns. Dry argon was flowed over the cast solution at a rate of about 8 meters per second during the evaporation step. The temperature of the plate and the argon were maintained at about 25 degrees centigrade. After about 30 minutes a solid phase began to appear in the liquid sheet. After about 120 minutes the cast separator appeared to be dry to the touch. The formed separator was separated from the plate. The free standing cast separator was approximately 100 microns thick. Upon examination the microcomposite structure was found to include a continuous gel phase and a continuous solid support phase in the form of a reticulated membrane. As used herein, "gel" includes materials that range from flowable liquids to sols and gel materials that will substantially hold their shapes with some slumping when unsupported.

The gel-electrolyte serves to conduct lithium ions through the separator. It is essential that the formed in situ gel phase be continuous throughout the separator. About 2 hours after casting the microcomposite structure exhibited a conductivity of from about 3.8 to 5.2 milliSiemens per centimeter. The microcomposite structure was subjected to a vacuum of 0.001 torr for a period of 12 hours. The conductivity was then about 2.4 to 3.5 milliSiemens per centimeter. A control sample without a surfactant, but otherwise the same, exhibited 2 orders of magnitude less conductivity after being exposed to vacuum for 12 hours. The surfactant dramatically enhanced the retention of the gel in the pores of the support structure.

Figure 2:
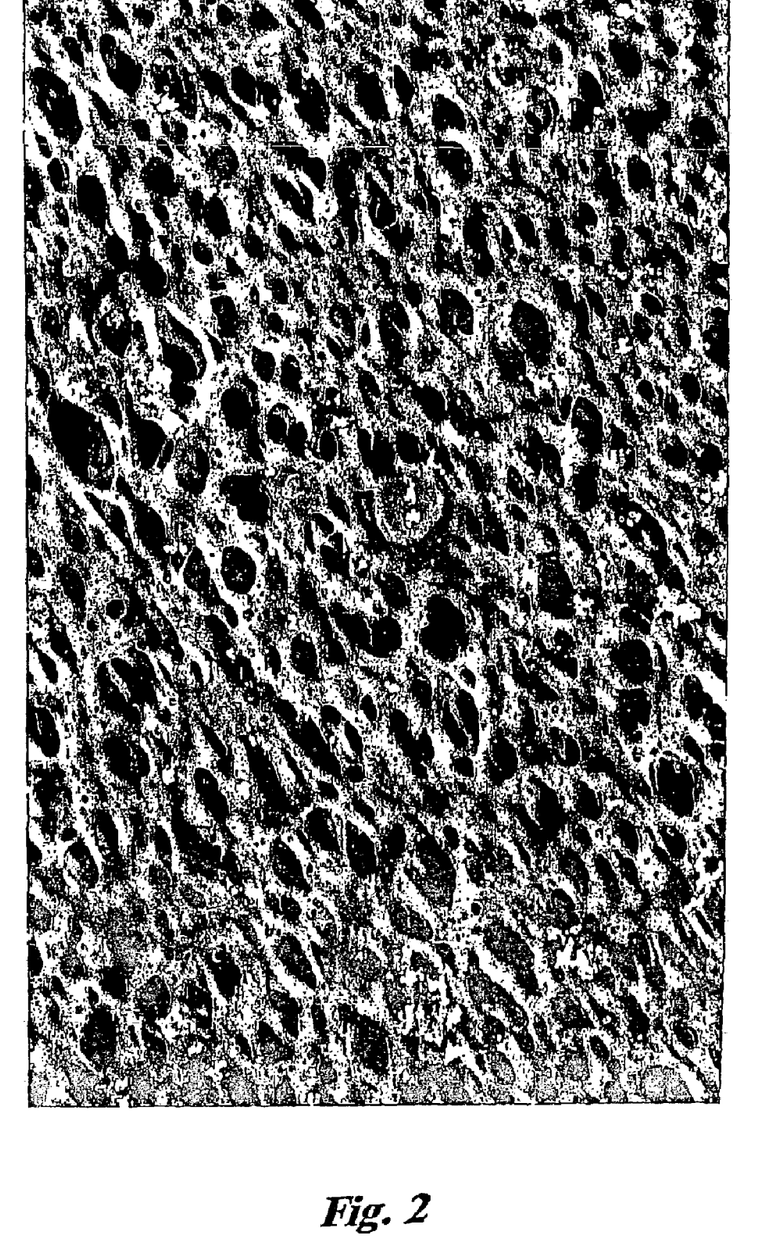
FIG. 2 is a magnified plan view of a preferred embodiment of the invention taken with a scanning electron microscope at a magnification of 1.00 K times showing the surface of a microcomposite structure from which most of the gel has been evaporated.
Figure 3:
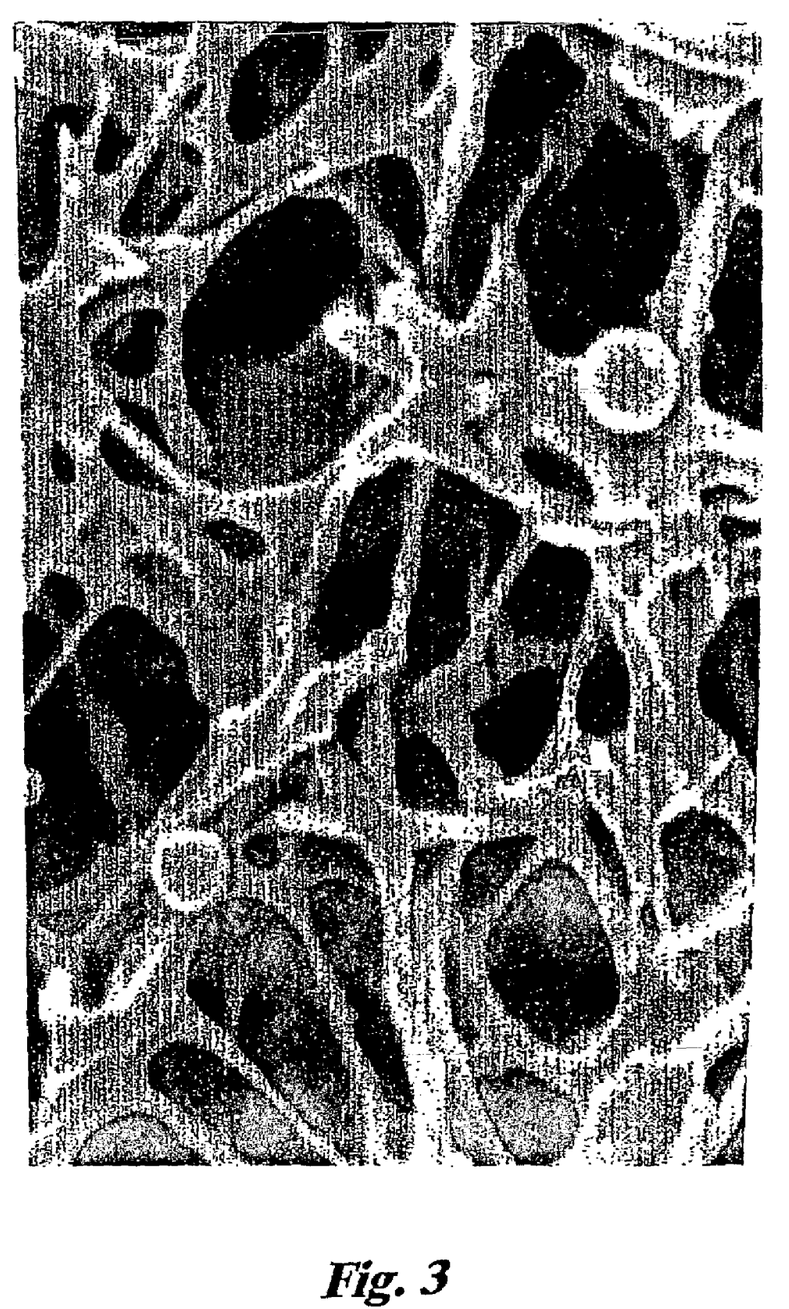
FIG. 3 is a magnified plan view of a preferred embodiment of the invention taken with a scanning electron microscope at a magnification of 17.41 K times showing the surface of a microcomposite structure from which most of the gel phase has been evaporated.
Figure 4:
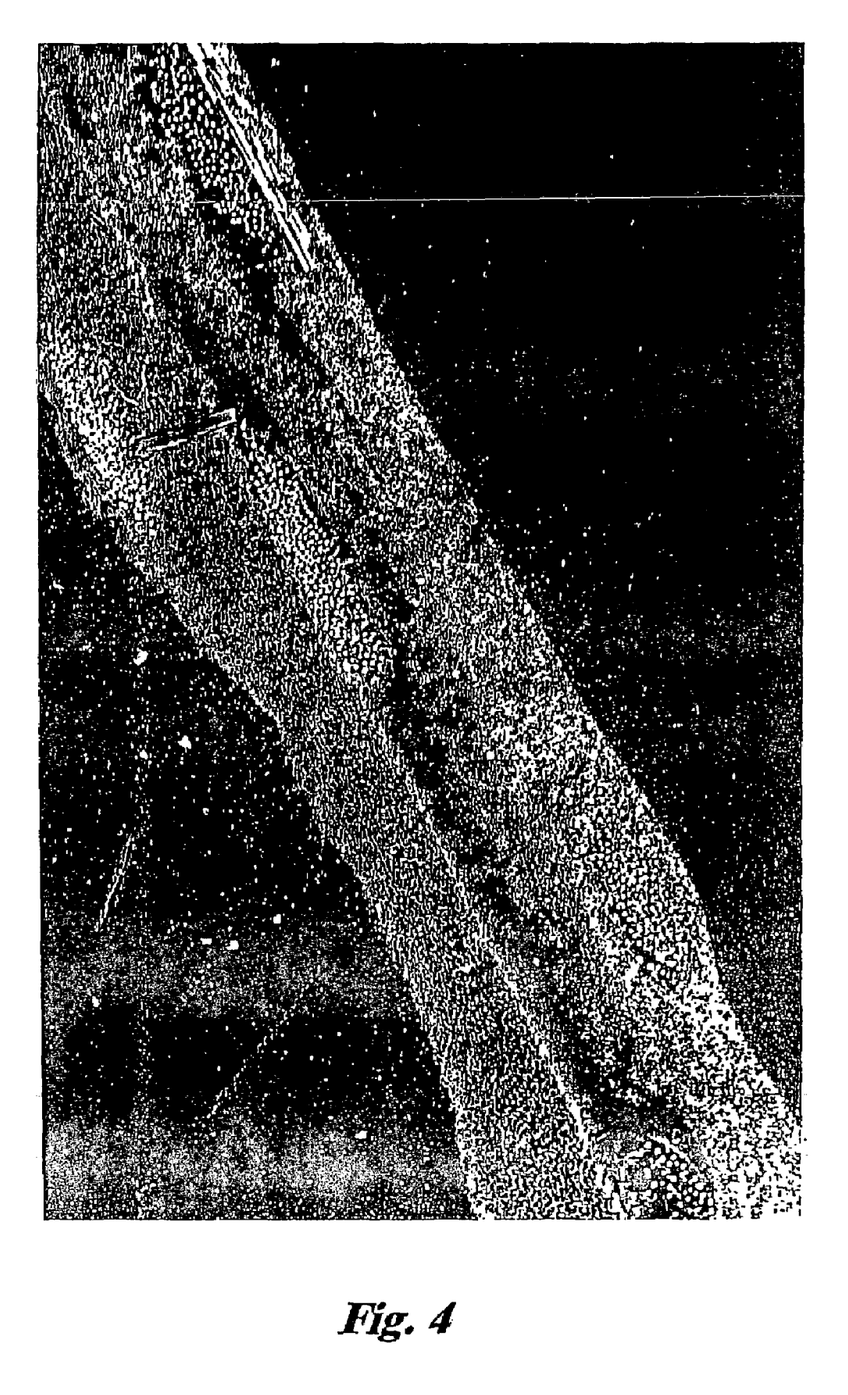
FIG. 4 is a magnified cross-sectional view of a preferred embodiment of the invention taken with a scanning electron microscope at a magnification of 55 times showing the edge of a microcomposite structure of an anode-separator-cathode in which the gel is visible as inclusions.
Figure 5:
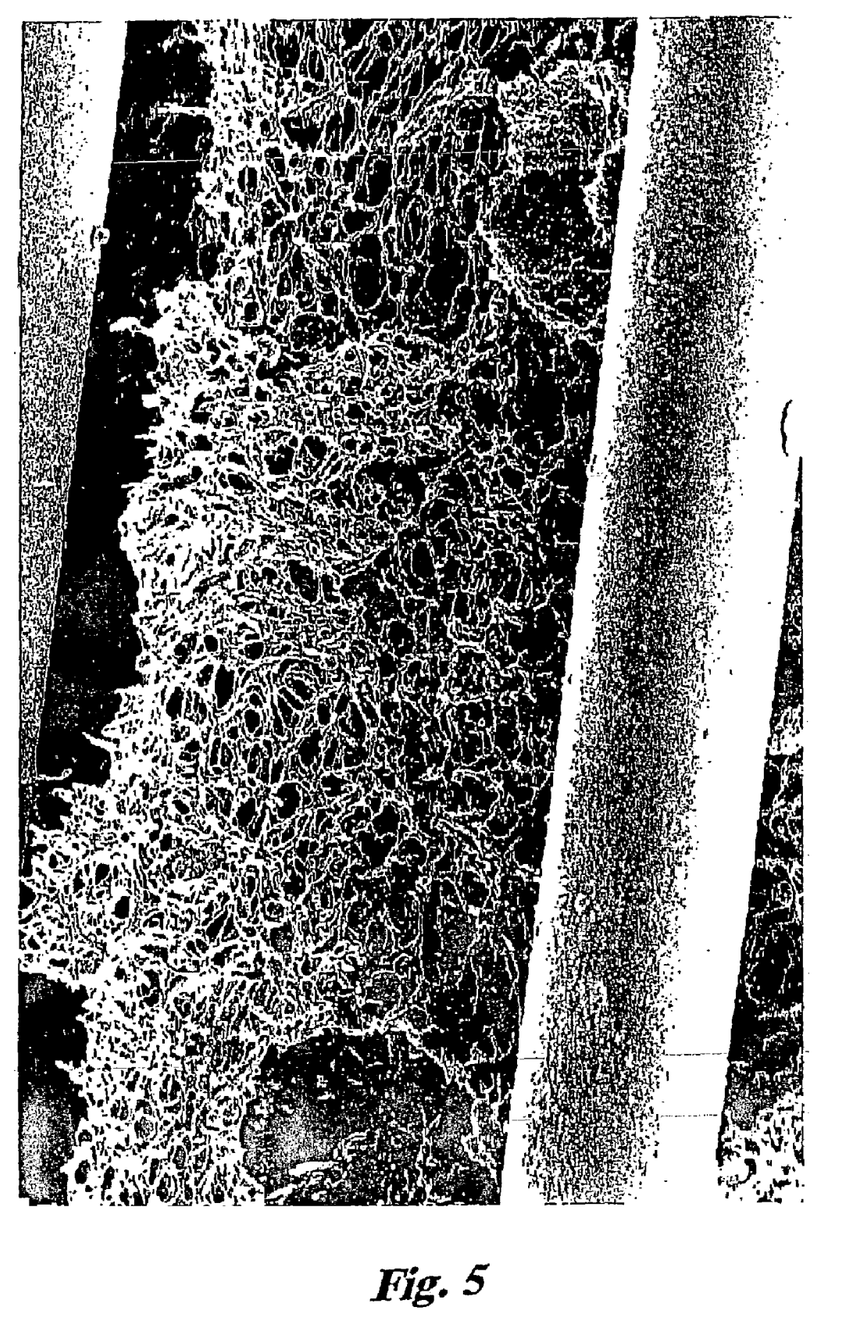
FIG. 5 is a magnified view of a preferred embodiment of the invention taken with a scanning electron microscope at a magnification of 2.50 K times showing a metallic coated fiberglass filament in a microcomposite structure from which most of the gel phase has been evaporated.

The reticulated structure was not fully organized in the sense that the pores were not uniform in either size or shape. The average pore size ranged from approximately 0.1 to 2 microns in size. See, for example, FIGS. 2, 3, and 5.

While not intending to be bound by any theory, it is believed that in the finished microcomposite structure the surfactant appears as a fined grained precipitate formed in situ at the interface between the gel and solid phases, and causes the gel to wet the solid phase. This, it is believed, retards and substantially prevents the evaporation of the solvent from the gel phase. It is believed that the surfactant also retards the formation of the solid phase during the evaporation stage, and causes the formation of smaller pores and a better organized, more uniform reticulated solid phase. The accumulation of the solid phase surfactant at the gel-solid phase interface is particularly effective with the preferred polyvinyl chloride-polystyrene soild phase polymer system.

Repeating this example without the lithium toluene sulfonate produced a separator that quickly dried to the point where there was substantially no gel. The rate of solvent evaporation was much more rapid than with the surfactant containing structure. Also, the reticulated structure was less organized and the pore sizes varied more widely.

Repeating this example using hexane, or toluene, or benzene, or tetrachloroethylene, or tetrachloroethane, or mixtures thereof, and the like, as the non-solvent for the PVC and PS polymers, instead of cyclohexane, produces satisfactory results.

The selection of the specific quantities and proportions of the various components of the liquid phase mixture from which the microcomposite structure is formed depends on the nature of the various components. Changing one component often necessitates a change in the quantities and proportions of the other components. Changing, for example, the molecular weight or proportions of the polymer blend often requires an adjustment in the aprotic solvent system. There should be a sufficient amount of the aprotic solvent system to dissolve the polymer blend. There should be a sufficient amount of surfactant to stabilize the gel phase in the pores of the solid polymer phase, and there should be a sufficient amount of surfactant solvent system to dissolve the surfactant. There should be sufficient phase separation liquid to cause the solid polymer phase to form as the aprotic solvent system evaporates. Those skilled in the art will be able, without undue experimentation, to determine the proper proportions and concentrations from these guidelines. In general, it is believed that formation of the microcomposite structure occurs primarily through physical phase changes rather than chemical reactions.

Repeating this example replacing the solvents in the aprotic solvent system with butylene carbonate, diethylcarbonate, dipropyl carbonate, ethyl methyl carbonate, 1,2-dimethoxymethane, 1,2-diethoxyethane, 1,2-dibutoxyethane, and 2-methyltetrahydrofuran, and the like, produces satisfactory results.

Repeating this example using polyvinyl chloride polymers with molecular weights ranging from approximately 43,000 to 250,000 molecular units, and the like, produces satisfactory results. The structural properties of the microcomposite structure degrade as the molecular weight of the polyvinyl chloride decreases, and the electrical conductivity improves.

Repeating this example using polystyrene polymers with molecular weights ranging from approximately 60,000 to 290,000 molecular units, and the like, produces satisfactory results. The structural properties of the microcomposite structure degrade as the molecular weight decreases, but the electrical properties remain substantially constant.

Repeating this example using polystyrene to polyvinyl chloride ratios of from about 0.05:1 to 0.6:1 produces satisfactory results. Where the proportions of the polystyrene are low, the electrical conductivity is high but the physical properties are poor. Increasing the proportion of the polystyrene increases the physical properties at the expense of the electrical properties.

Repeating this example using lithium styrene sulfonate, or other lithium salts of anionic surfactants, and the like, produces satisfactory results. Suitable anionic surfactants include, for example, the lithium salts of alkylaryl sulfonates where the aromatic portion of the molecule has been sulfonated, and the like.

Satisfactory results are achieved from separators that are produced having average pore sizes ranging from approximately 0.1 to 10 microns.

Figure 1:
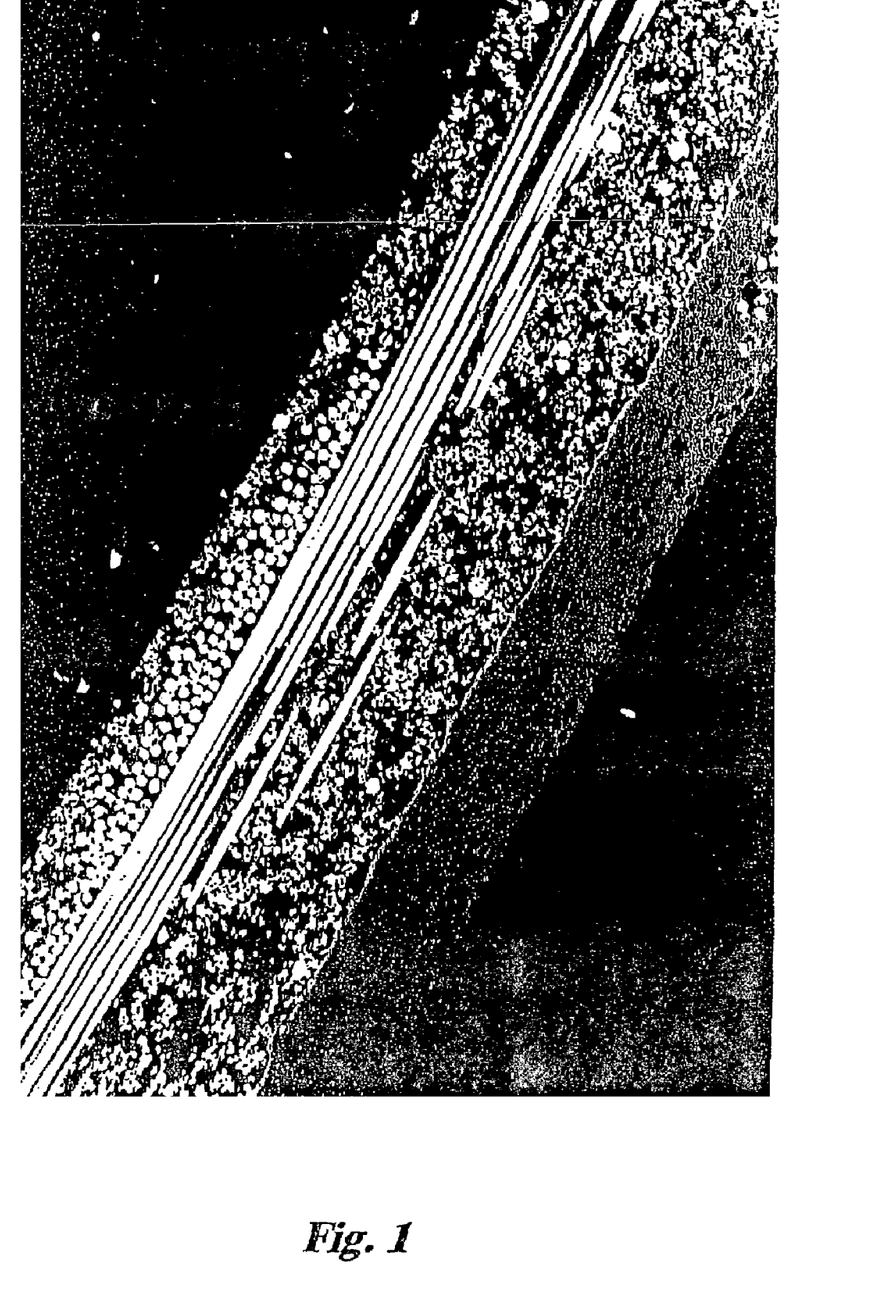
FIG. 1 is a magnified cross-sectional view of a preferred embodiment of the invention taken with a scanning electron microscope at a magnification of 126 times showing a metallic coated fiberglass mat between an anode and a cathode with formed in situ gel phase inclusions visible in the pores.

The present invention has been described by reference to the preparation of a separator for a lithium-ion battery. The same structures, with different but well known additives in the gel phase serve equally well as anodes or cathodes, or the like in, for example, secondary lithium-ion batteries. The microcomposite structure can be formed so that the anode, separator and cathode are essential all one continuous microcomposite structure with each one grading into the one adjacent to it. See, for example, FIG. 1. When loaded with the active ingredients that permit it to function as a separator, the structure is positioned between an anode and a cathode in a lithium-ion battery so that lithium-ions flow between the adjacent electrodes through the gel-electrolyte phase. The microcomposite structure can be cast on a support such as a web. Suitable supporting web materials include, for example, fiberglass, conductively coated fiberglass, and the like. See, for example, FIGS. 1 and 5. When coated with conductive materials such as aluminum, copper, nickel, stainless steel of the 30 and 400 series, and the like, the supporting web serves as a current collector. Such conductive coatings can be applied, for example, on fiberglass to a thickness of 0.1 to 5, preferably 1 to 2 microns by magnetron sputtering, or the like, Repeating this example using $LiPF_6$, $LiClO_4$, $LiAsF_6$, $LiBF_4$, $LiAlCl_4$, $CH_3SO_3Li$, $CF_3SO_3Li$, $LiB(C_6H_5)_4$, and $CF_3COOLi$, and the like, in place of the lithium hexaphosphide electrolyte salt produces satisfactory results.

Repeating this example using methanol or propanol, and methyl ethyl ketone, and the like, in place of the ethanol and acetone solvent systems produces satisfactory results. Other suitable solvent systems for the anionic surfactant include, for example, ethyl ketone, butanol, and diethyl ketone.

Satisfactory results are obtained operating the casting step at temperatures ranging from approximately −10 to +80 degrees centigrade.

Repeating the evaporating step of this example in an atmosphere of air, the moisture content of the air was reduced to the point where the dew point of the air was less than about −60 degrees centigrade. Satisfactory results were achieved.

The microcomposite structure can be formed by batch or continuous operations. In continuous operations the structure is typically cast on a moving belt or web. The respective electrodes and separator can be formed and then joined to one another in a continuous operation. If the solvent level is at the level where the structure is tacky, the respective elements of the structure adhere to one another. The solvent level can be adjusted to the tacky level by, for example, joining the elements before the solvent has evaporated or by the application of additional solvent to a substantially dry feeling element.

After the initial solution is cast, the solvents evaporate until there are only enough of the solvents left to form a gel. At this point the rate of the evaporation of the solvent decreases dramatically to a very low value. The evaporation of the solvents decreases dramatically at the gel stage because the gel includes a surfactant. Without the presence of the surfactant, evaporation of the solvents would continue at a rapid rate and the gel phase could not be sustained. When used as a component in a battery, the microcomposite structure is preferably enclosed within a sealed container so that the evaporation of the solvent is essentially stopped.

While not intending to be bound by any particular theory, the gel phase electrolyte is believed to be comprised primarily of polyvinyl chloride, polystyrene, and solvents, with minor but effective amounts of surfactant and electrolyte salt.

The ingredients in the initial solution, and the conditions in the casting and evaporating steps determine the character of both the solid reticulated and gel-electrolyte phases. The presence of a surfactant in the initial solution promotes the formation of smaller open cells, and a somewhat better organized (more regular) reticulated structure.

The essential ingredients in the initial solution for the formation of the microcomposite structure include a polymer blend, preferably of polyvinyl chloride, polystyrene, a surfactant that will cause the gel to wet the solid phase, an aprotic solvent system for the polymer blend, a solvent system for the surfactant, and a liquid non-solvent for the polymer blend that is soluble in the aprotic solvent. For the microcomposite structure to function, for example, as a separator in a lithium-ion battery the initial solution must also include an electrolyte salt and a solvent for that salt. Preferably, the solvent for the electrolyte salt is provided by the aprotic solvent system. The mobility of the lithium ions through the separator depends on maintaining the gel phase. If the gel phase disappears, the mobility of the lithium ions is drastically reduced or eliminated.

What have been described are preferred embodiments in which modifications and changes may be made without departing from the spirit and scope of the accompanying claims. Obviously many modifications and variations of the present invention are possible in light of the above teachings. It is therefore to be understood that, within the scope of the appended claims, the invention may be practiced otherwise than as specifically described.

What is claimed is:

1. A liquid phase mixture for use in preparing a microcomposite structure, said microcomposite structure being composed of a continuous solid phase reticulated membrane loaded with a formed in situ continuous gel phase, and including a solid phase anionic surfactant at an interface between said solid and gel phases, said solution comprising:

a polymer blend consisting essentially of polyvinyl chloride and polystyrene, said polyvinyl chloride and polystyrene being present in said polymer blend in a ratio of from about 1:0.05 to 1:0.6;

an amount of an aprotic solvent system selected from the group consisting of propylene carbonate, dimethyl carbonate, ethylene carbonate, tetrahydrofuran, butylene carbonate, diethylcarbonate, dipropyl carbonate, ethyl methyl carbonate, 1,2-dimethoxymethane, 1,2-diethoxyethane, 1,2-dibutoxyethane, and 2-methyltetrahydrofuran, and mixtures thereof that is sufficient to dissolve said polymer blend;

an amount of said anionic surfactant selected from the group consisting of lithium styrene sulfonate, lithium salts of alicylaryl sulfonates, and mixtures thereof that is sufficient to stabilize said gel phase;

an amount of a surfactant solvent system selected from the group consisting of mixtures of ethanol and acetone, methanol, propanol, methyl ethyl ketone, ethyl ketone, butanol, diethyl ketone, and mixtures thereof that is sufficient to dissolve said anionic surfactant; and a phase separation liquid that is miscible with said aprotic solvent system, and in which said polymer blend is substantially insoluble, said phase separation liquid being present in an amount that is effective to promote the formation of the solid and gel phases.

2. A solution for use in preparing a microcomposite structure of claim 1 including an amount of a substantially dissolved electrolyte salt that is sufficient to permit ions to move through said gel phase.

3. A process for preparing a microcomposite structure composed of a continuous solid phase reticulated membrane loaded with a formed in situ continuous gel phase, and including a solid phase anionic surfactant at an interface between said solid and gel phases, said process comprising:

selecting a polymer blend consisting essentially of polyvinyl chloride and polystyrene, said polyvinyl chloride and polystyrene being present in said polymer blend in a ratio of from about 1:0.05 to 1:0.6;

selecting an amount of an aprotic solvent system selected from the group consisting of propylene carbonate, dimethyl carbonate, ethylene carbonate, tetrahydrofuran, butylenes carbonate, diethylcarbonate, dipropyl carbonate, ethyl methyl carbonate, 1,2-dimethoxymethane, 1,2-diethoxyethane, 1,2-dibutoxyethane, and 2-methyltetrahydrofuran, and mixtures thereof that is sufficient to dissolve said polymer blend;

selecting an amount of said anionic surfactant from the group consisting of lithium styrene sulfonate, lithium salts of alkylaryl sulfonates, and mixtures thereof that is sufficient to stabilize said gel phase;

selecting an amount of a surfactant solvent system from the group consisting of mixtures of ethanol and acetone, methanol, propanol, methyl ethyl ketone, ethyl ketone, butanol, diethyl ketone, and mixtures thereof that is sufficient to dissolve said anionic surfactant;

selecting a phase separation liquid that is miscible with said aprotic solvent system, and in which said polymer blend is substantially insoluble, including selecting an amount of said phase separation liquid to promote the formation of said microcomposite structure;

mixing said polymer blend, said surfactant, said solvent systems and said phase separation liquid together to form a liquid phase mixture;

casting said liquid phase mixture into a desired configuration; and allowing said solvent systems to evaporate to form said microcomposite structure.

4. A process for preparing a microcomposite structure of claim 3 including selecting an amount of an electrolyte salt that is sufficient to permit ions to move through said microcomposite structure, and including said electrolyte salt in said mixing.

5. A microcomposite structure including a continuous reticulated solid phase and an interdispersed formed in situ continuous gel phase, said microcomposite structure comprising:

a polymer blend consisting essentially of polyvinyl chloride and polystyrene forming said reticulated solid phase;

a mixture comprising a polymer blend of polyvinyl chloride and polystyrene, and a gel forming amount of an aprotic solvent system selected from the group consisting of propylene carbonate, dimethyl carbonate, ethylene carbonate, tetrahydrofuran, butylene carbonate, diethylcarbonate, dipropyl carbonate, ethyl methyl carbonate, 1,2-dimethoxymethane, 1,2-diethoxyethane, 1,2-dibutoxyethane, and 2-methyltetrahydrofuran, and mixtures thereof for said polymer blend forming said gel phase; and a gel phase stabilizing amount of a solid phase anionic surfactant selected from the group consisting of lithium styrene sulfonate, lithium salts of alkylaryl sulfonates, and mixtures thereof at an interface between said solid and gel phases.

6. A battery including an anode, a cathode and a separator therebetween, said battery comprising a substantially continuous microcomposite structure, said microcomposite structure comprising:

a continuous reticulated solid phase and a formed in situ continuous gel phase interdispersed with said reticulated solid phase;

said reticulated solid phase being formed of a polymer blend consisting essentially of polyvinyl chloride and polystyrene;

said gel phase being formed of a mixture comprising a polymer blend of polyvinyl chloride and polystyrene, a gel forming amount of an aprotic solvent system for said polymer blend selected from the group consisting of propylene carbonate, dimethyl carbonate, ethylene carbonate, tetrahydrofuran, butylene carbonate, diethylcarbonate, dipropyl carbonate, ethyl methyl carbonate, 1,2-dimethoxymethane, 1,2-diethoxyethane, 1,2-dibutoxyerhane, and 2-methyltetrahydrofuran, and mixtures thereof; and a gel phase stabilizing amount of a solid phase anionic surfactant selected from the group consisting of lithium styrene sulfonate, lithium salts of alkylaryl sulfonates, and mixtures thereof at an interface between said solid and gel phases.

7. A process for forming a battery including an anode, a cathode and a separator therebetween, said battery comprising a plurality of microcomposite structures, each of said microcomposite structures including a continuous reticulated solid phase and a formed in situ continuous gel phase interdispersed with said reticulated solid phase, said reticulated solid phase being formed of a polymer blend consisting essentially of polyvinyl chloride and polystyrene forming, said gel phase being formed of a mixture comprising a polymer blend of polyvinyl chloride and polystyrene, a gel forming amount of an aprotic solvent system for said polymer blend from the group consisting of propylene carbonate, dimethyl carbonate, ethylene carbonate, tetrahydrofuran, butylene carbonate, diethylcarbonate, dipropyl carbonate, ethyl methyl carbonate, 1,2-dimethoxymethane, 1,2-diethoxyerhane, 1,2-dibutoxyethane, and 2-methyltetrahydrofuran, and mixtures thereof and a gel phase stabilizing amount of solid phase anionic surfactant selected from the group consisting of lithium styrene sulfonate, lithium salts of alkylaryl sulfonates, and mixtures thereof present at an interface between said solid and gel phases, said process comprising:

preparing a said microcomposite structure as an anode;
preparing a said microcomposite structure as a separator;
preparing a said microcomposite structure as a cathode;
adhering said anode and cathode on opposed faces of said separator when said opposed faces are sufficiently moist with said aproitic solvent system to enable said anode and cathode to bond to said separator.

8. A process of claim 7 for forming a battery wherein said process is carried out batchwise.

9. A process of claim 7 for forming a battery wherein said process is carried out continuously.

10. A liquid phase mixture for use in preparing a microcomposite structure composed of a continuous solid phase reticulated membrane loaded with a formed in situ continuous gel phase, said solution comprising:

a polymer blend consisting essentially of polyvinyl chloride and polystyrene;

a sufficient amount of an aprotic solvent system from the group consisting of propylene carbonate, dimethyl carbonate, ethylene carbonate, tetrahydrofuran, butylene carbonate, diethylcarbonate, dipropyl carbonate, ethyl methyl carbonate, 1,2-dimethoxymethane, 1,2-diethoxyethane, 1,2-dibutoxyethane, and 2-methyltetrahyclrofuran, and mixtures thereof to dissolve the polymer blend;

a sufficient amount of an anionic surfactant to stabilize the gel phase selected from the group consisting of lithium styrene sulfonate, lithium salts of alkylaryl sulfonates, and mixtures thereof to stabilize the gel phase;

a sufficient amount of a surfactant solvent system selected from the group consisting of ethanol, acetone, methanol, propanol, methyl ethyl ketone, ethyl ketone, butanol, diethyl ketone. and mixtures thereof to dissolve the anionic surfactant; and a phase separation liquid that is miscible with said aprotic solvent system, and in which the polymer blend is substantially insoluble, to promote the formation of the solid and gel phases and the precipitation of the anionic surfactant at an interface between said solid and gel phases.

* * * * *